(12) United States Patent
Dufault et al.

(10) Patent No.: US 10,550,552 B2
(45) Date of Patent: Feb. 4, 2020

(54) METHOD FOR FLUID PRESSURE CONTROL IN A CLOSED SYSTEM

(71) Applicant: Graco Minnesota Inc., Minneapolis, MN (US)

(72) Inventors: Peter N. Dufault, Saint Paul, MN (US); Todd A. Anderson, Elk River, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/306,917

(22) PCT Filed: Apr. 28, 2015

(86) PCT No.: PCT/US2015/027955
§ 371 (c)(1),
(2) Date: Oct. 26, 2016

(87) PCT Pub. No.: WO2015/168099
PCT Pub. Date: Nov. 5, 2015

(65) Prior Publication Data
US 2017/0043359 A1    Feb. 16, 2017

Related U.S. Application Data

(60) Provisional application No. 61/987,250, filed on May 1, 2014.

(51) Int. Cl.
*E03C 1/04* (2006.01)
*B05B 12/08* (2006.01)
(Continued)

(52) U.S. Cl.
CPC .......... *E03C 1/0408* (2013.01); *B05B 12/085* (2013.01); *B05B 12/088* (2013.01);
(Continued)

(58) Field of Classification Search
CPC ......... B05B 1/30; B05B 12/00; B05B 12/006; B05B 12/10; B05B 12/12; B05B 12/085; G05D 16/06
(Continued)

(56) References Cited

U.S. PATENT DOCUMENTS 4,019,653 A    4/1977 Scherer et al.
4,324,366 A    4/1982 Geier et al.
(Continued)

FOREIGN PATENT DOCUMENTS

CN    101622506 A    1/2010
CN    102186675 A    9/2011
(Continued)

OTHER PUBLICATIONS

Extended European Search Report for EP Application No. 15785894.5, dated Nov. 28, 2017, 10 pages.
(Continued)

*Primary Examiner* — Alexander M Valvis
*Assistant Examiner* — Qingzhang Zhou
(74) *Attorney, Agent, or Firm* — Kinney & Lange, P.A.

(57) ABSTRACT

A method for controlling a system pressure within a closed system includes sending a signal to a pressure control valve corresponding to a pressure set point and actuating the pressure control valve to vary a pilot pressure of a control fluid contained within a pressure control line that is fluidly connected to a pressure regulator. A diaphragm of the pressure regulator is disposed between the pressure control line and a system line and acts on a fluid with the system line to modify the system pressure.

10 Claims, 2 Drawing Sheets

(51) Int. Cl.
   *B05B 12/14* (2006.01)
   *G05D 11/13* (2006.01)
   *G05D 16/20* (2006.01)
(52) U.S. Cl.
   CPC ........ *B05B 12/1418* (2013.01); *G05D 11/132* (2013.01); *G05D 16/2095* (2019.01)
(58) Field of Classification Search
   USPC ............ 239/127, 127.1, 127.3, 441; 222/192
   See application file for complete search history.

(56) References Cited

U.S. PATENT DOCUMENTS

| | | | |
|---|---|---|---|
| 4,487,367 A | | 12/1984 | Perry et al. |
| 4,562,088 A | | 12/1985 | Navarro |
| 4,602,653 A | | 7/1986 | Ruiz-Vela et al. |
| 4,614,300 A | | 9/1986 | Falcoff |
| 4,720,807 A | | 1/1988 | Ferran et al. |
| 4,848,657 A | | 7/1989 | Hashimoto et al. |
| 4,858,172 A | | 8/1989 | Stern |
| 4,877,051 A | | 10/1989 | Day |
| 5,107,441 A | | 4/1992 | Decker |
| 5,182,704 A | * | 1/1993 | Bengtsson ........... G05D 7/0688 118/696 |
| 5,197,800 A | | 5/1993 | Saidman et al. |
| 5,215,253 A | | 6/1993 | Saidman et al. |
| 5,330,783 A | | 7/1994 | Saidman et al. |
| 5,520,333 A | | 5/1996 | Tofte |
| 5,609,136 A | | 3/1997 | Tuken |
| 6,112,137 A | | 8/2000 | McCarty et al. |
| 6,149,071 A | | 11/2000 | MacCallumMhor et al. |
| 6,223,645 B1 | | 5/2001 | Elberson |
| 7,004,402 B2 | | 2/2006 | Borders et al. |
| 7,114,517 B2 | | 10/2006 | Sund et al. |
| 7,363,100 B2 | | 4/2008 | Skelton-Becker et al. |
| 7,603,186 B2 | | 10/2009 | Smirnov |
| 7,706,926 B2 | | 4/2010 | Peterson |
| 7,798,167 B2 | | 9/2010 | Ohmi et al. |
| 8,082,946 B2 | | 12/2011 | Laverdiere et al. |
| 8,915,262 B2 | | 12/2014 | Smirnov |
| 8,920,574 B2 | | 12/2014 | Bhaumik et al. |
| 2004/0089234 A1 | | 5/2004 | Hagglund et al. |
| 2004/0104244 A1 | | 6/2004 | Cline et al. |
| 2004/0262428 A1 | * | 12/2004 | Wulteputte ........... B05B 7/2489 239/290 |
| 2008/0047611 A1 | | 2/2008 | Stemer |
| 2008/0262650 A1 | | 10/2008 | Dorendorf et al. |
| 2009/0194604 A1 | | 8/2009 | Smith |
| 2012/0009329 A1 | | 1/2012 | Mather et al. |
| 2012/0168004 A1 | * | 7/2012 | Terrier ................ B05B 12/087 137/505 |
| 2012/0173027 A1 | | 7/2012 | Cheng et al. |
| 2012/0203475 A1 | | 8/2012 | Wilkens et al. |
| 2013/0146148 A1 | | 6/2013 | Smirnov |
| 2014/0005841 A1 | | 1/2014 | Cheng et al. |

FOREIGN PATENT DOCUMENTS

| | | |
|---|---|---|
| CN | 102856570 A | 1/2013 |
| DE | 2819302 B2 | 12/1980 |
| DE | 3423094 A1 | 1/1986 |
| EP | 0741349 A2 | 11/1996 |
| EP | 1481736 A2 | 12/2004 |
| JP | H03127655 A | 5/1991 |
| JP | H10303153 A | 11/1998 |
| JP | H11314281 A | 11/1999 |
| JP | 2000213466 A | 8/2000 |
| JP | 2002544579 A | 12/2002 |
| JP | 2003290709 A | 10/2003 |
| JP | 2007503982 A | 3/2007 |
| KR | 20090027273 A | 3/2009 |
| WO | WO 0234417 A1 | 5/2002 |

OTHER PUBLICATIONS

Extended European Search Report for EP Application No. 15786269.9, dated Nov. 28, 2017, 5 pages.
International Search Report and Written Opinion for Application Serial No. PCT/US2015/027919, dated Jul. 20, 2015, 10 pages.
International Search Report and Written Opinion for Application Serial No. PCT/US2015/027955, dated Jul. 27, 2015, 13 pages.
Ohinese Office Action for CN Application No. 2015800156703, dated May 11, 2018, 5 pages.
First Japanese Office Action for JP Application No. 2016-561270, dated Mar. 27, 2019, pp. 7.
First Japanese Office for JP Application No. 2016-561280, dated Apr. 10, 2019, pp. 8.
Second Japanese Office Action for JP Application No. 2016-561270, dated Nov. 13, 2019, 5 pages.

* cited by examiner

METHOD FOR FLUID PRESSURE CONTROL IN A CLOSED SYSTEM

BACKGROUND

The present invention relates generally to controlling one or more system parameters and, more particularly, to fluid pressure control within a closed system.

Industrial systems that control various system parameters (e.g. pressure, flow rate, temperature, and the like) often encounter various system disturbances. In order to maintain the system within established parameters, the control scheme for the system is designed to respond to environmental changes and variable properties of fluids or materials contained within the system. Such control systems often detect and counteract gradual changes in the system through monitoring parameters critical to system performance.

Some industrial systems utilize sprayers to dispense material (e.g. paint, adhesive, epoxy, and the like) at a specific pressure and flow rate. In some systems that operate continuously or for relatively long periods of time at a single pressure and flow rate, the pressure and flow rate reach steady state. Thus, minor changes in the material and/or system performance can be carefully monitored and counteracted by a conventional control scheme.

However, when such systems operate at multiple pressure and flow rate combinations in which some conditions operate for relatively short durations, the pressure and flow rate do not reach steady state. Pressure and flow rate changes and/or fluctuations during these transient periods within the system are problematic for control systems because conditions are different at the sprayer outlet than at measurement locations within the system. Failing to account for these transient conditions can result in over-dispensing or under-dispensing material.

In some traditional control schemes, transient periods are controlled by segregating system operating conditions and performing a calibration routine prior to performing each operation. However, calibration routines increase manufacturing costs and disrupt manufacturing work flow because production pauses during the calibration routine. In other traditional control schemes, transient periods are controlled by dispensing excess material until the system reaches steady state. Once the system is at steady state, the traditional control scheme is capable of accounting for minor disturbances. However, dispensing excess material increases material costs.

Therefore, a need exists for controlling the pressure and flow rate of an industrial system that can cost-effectively adapt to multiple operating conditions, environmental changes, and transient conditions.

SUMMARY

A method for controlling a system pressure within a closed system includes sending a signal to a pressure control valve corresponding to a pressure set point and actuating the pressure control valve to vary a pilot pressure of a control fluid contained within a pressure control line that is fluidly connected to a pressure regulator. A diaphragm of the pressure regulator is disposed between the pressure control line and a system line and acts on a fluid with the system line to modify the system pressure.

A method of varying a system pressure of a sprayer system includes actuating a spray gun to stop a flow through the sprayer system, using a controller to establish a pressure set point, sending a signal from the controller to a pressure control valve corresponding to the pressure set point, and actuating the pressure control valve to vary a pilot pressure of a control fluid within a control line that is fluidly connected to a pressure regulator. A diaphragm of the pressure regulator fluidly separates the control fluid from a fluid contained within a system line and acts on the fluid to vary the system pressure.

DETAILED DESCRIPTION

Figure 1:
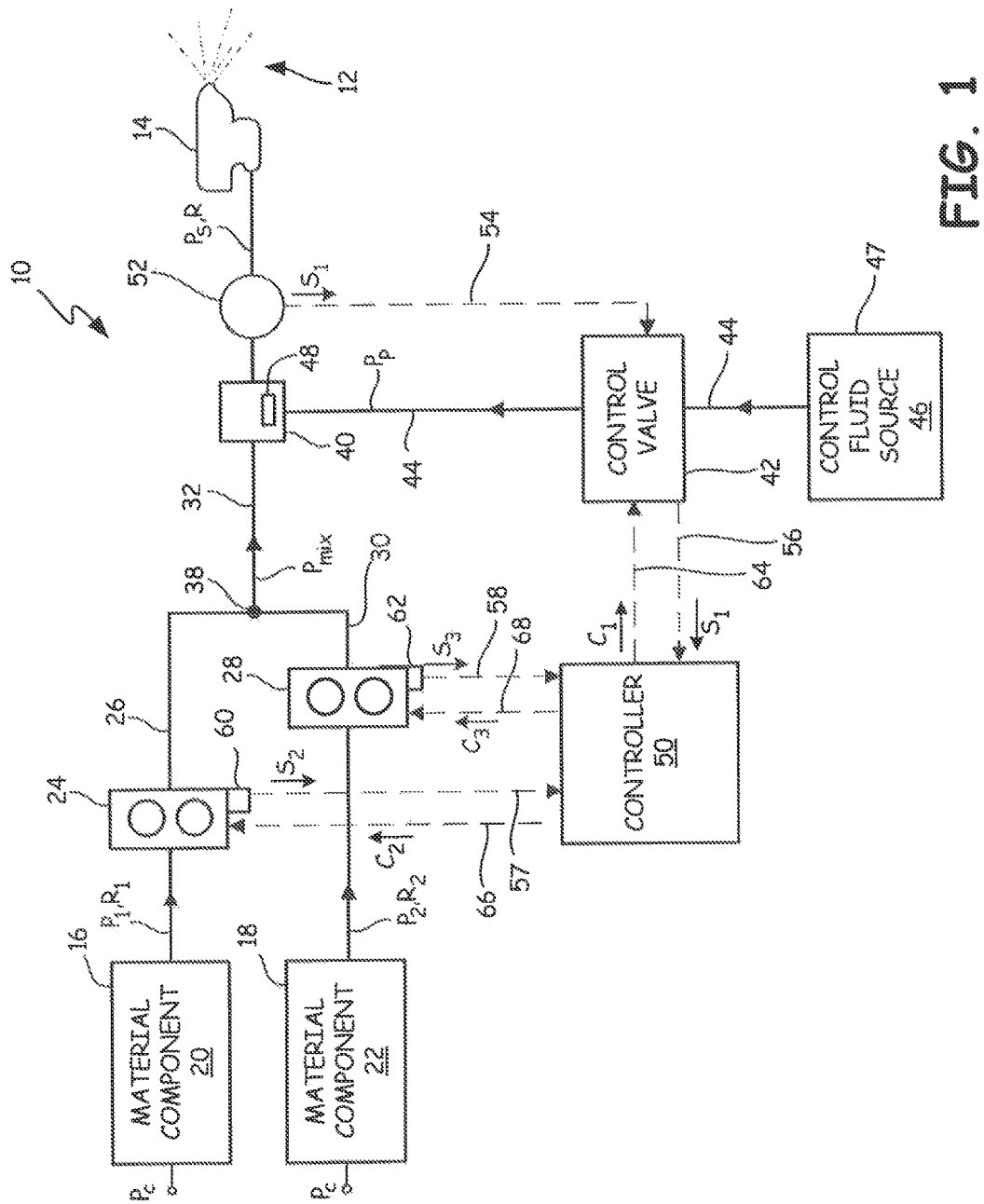
FIG. 1 is a schematic diagram showing an industrial sprayer system.

FIG. 1 is a schematic diagram of industrial system 10 for dispensing mixed material 12 from sprayer 14, such as a passive proportioner system. Industrial system 10 includes, among other components described hereafter, material supply systems 16 and 18, which contain material components 20 and 22, respectively. Material supply system 16 is fluidly connected to meter 24 with supply line 26, and material supply system 18 is fluidly connected to meter 28 with supply line 30. Material supply system 16 acts on material component 20 to increase its pressure from initial pressure P0 to supply pressure P1. Similarly, material supply system 18 acts on material component 22 to increase its pressure from initial pressure P0 to supply pressure P2. Material supply systems 16 and 18 can be pressurized tanks containing material components 20 and 22, respectively. Alternatively, material supply systems 16 and 18 can include feed pumps or other circulating components that act on material components 20 and 22, respectively. As such, initial pressure P0 can range from ambient pressure (0 kPa gage) to a pressure suitable for supplying material components 20 and 22, typically no greater than 2068 kPa gage (300 psig). Additionally, initial pressure P0 for material supply system 16 does not necessarily equal initial pressure P0 for material supply system 18. For instance, initial pressures P0 can be tailored to the material properties of material components 20 and 22. Meters 24 and 28 are disposed along supply lines 26 and 30, respectively. Supply lines 26 and 30 fluidly connect material supply systems 16 and 18, respectively, to mixed material line 32 at junction 38 where supply lines 26 and 30 join. Mixed material line 32 fluidly connects supply lines 26 and 30 at junction 38 to spray gun 14. Meters 24 and 28 are arranged in parallel and cooperate to supply material components 20 and 22 to mixed material line 32 where components 20 and 22 combine to form mixed material 12 having mixed pressure Pmix. Meters 24 and 28 supply mixed material 12 to sprayer 14 at flow rate R where it is selectively dispensed.

Pressure regulator 40 is disposed along mixed material line 32 to reduce mixed pressure Pmix to system pressure Ps prior to dispensing mixed material 12 from spray gun 14. Adjustment of system pressure Ps is accomplished by using control valve 42 to vary pilot pressure Pp. Control valve 42 is disposed along control pressure line 44, which contains control fluid 46 and extends from control fluid source 47 to pressure regulator 40. Control fluid 46 acts on diaphragm 48 of pressure regulator 40 to modify system pressure Ps when system 10 is in a closed state. An increase in pilot pressure Pp increases system pressure Ps due to force application of diaphragm 48 on mixed material 12. A decrease of pilot pressure Pp decreases system pressure Ps due to a force reduction from diaphragm 48 on mixed material 12. When diaphragm 48 reduces force applied to mixed material 12, it acts on control fluid 46. Pilot pressure Pp of control fluid 46 is maintained by allowing a portion of control fluid 46 to return to control fluid source 47. In some embodiments, pressure regulator 40 is an air-operated, low flow pressure regulator.

System pressure Ps and flow rate R are managed by controller 50. Pressure transducer 52 disposed downstream from pressure regulator 40 produces signal 51, which is a voltage or current of pressure transducer 52. Signal line 54 electrically connects pressure transducer 52 to control valve 42, and signal line 56 electrically connects control valve 42 to controller 50, each signal line transmitting signal 51 to controller 50. Signal lines 57 and 58 electrically connect flow rate sensors 60 and 62 to controller 50, respectively. Flow rate sensor 60 detects flow rate R1 flowing through meter 24, and flow rate sensor 62 detects flow rate R2 flowing through meter 28. Flow rates R1 and R2 are transmitted to controller 50 in the form of signals S2 and S3, respectively, which like signal S1, are voltage or currents from sensors 60 and 62, respectively. Based on values of signals S1, S2, and S3, controller 50 executes a controlling scheme to modify flow rates R1 and R2 flowing through meters 24 and 28, respectively, and to modify system pressure Ps by commanding control valve 42 to change pilot pressure Pp. Material component 20, flowing at flow rate R1, combines with material component 22, flowing at flow rate R2, within mixed material line 32 to produce mixed material 12, flowing at flow rate R. Controller 50 modifies pilot pressure Pp by sending control signal C1 to control valve 42 with control line 64 and modifies flow rates R2 and R3 by sending control signals C2 and C3 to meters 24 and 28 with control lines 66 and 68, respectively.

Transient conditions exist within system 10 when actuating spray gun 14 to close system 10, which is typically accomplished with an air-actuated solenoid valve (not shown in FIG. 1) or a trigger of spray gun 14 (not shown in FIG. 1). Because flow rates are measured at meters 24 and 28 and not at spray gun 14, changes of system pressure Ps and flow rate R lag changes to pilot pressure Pp and flow rates R1 and R2. If controller 50 causes pressure regulator 40 to maintain a constant system pressure Ps when system 10 is closed, then the pressure at spray gun 14 increases due to the lack of flow-based pressure drop within system 10. Subsequently, when system 10 is opened (i.e. from opening the solenoid valve or trigger within spray gun 14), a burst of flow, driven by the prior pressure increase, causes non-uniform application of mixed material 12. If controller 50 causes pressure regulator 40 to increase system pressure Ps while system 10 is closed, then effects from a burst flow are amplified. When controller 50 causes system pressure Ps to decrease while system 10 is closed, hysteresis effects increase the error between the target pressure and system pressure Ps. The resulting system pressure Ps will not dispense mixed material 12 from spray gun 14 at the desired flow rate R.

Moreover, material property and/or environmental changes impact system pressure Ps and flow rate R during operation. For example, material components 20 and 22, respectively, are periodically replenished. Because newly added material components 20 and 22 can have different temperatures from each other and from the previously dispensed materials, properties such as viscosity can affect flow rate R as supplied to sprayer 14. Additionally, mixed material 12 can partially cure within mixed material line 32 and, over time, foul mixed material line 32. As such, mixed material line 32 is periodically cleaned with solvents. Environmental changes such as ambient temperature and humidity changes also affect the properties of material components 20 and 22. However, system 10 is designed to operate over a range of system pressures Ps and a range of flow rates R, each operating condition having duration.

Some spraying applications involve several discrete operating conditions. For example, three operating conditions could be used in sequential order: 1) dispense 100 cc/min at 68.9 kPA (about 10 psi) for 10 seconds, 2) dispense 200 cc/min at 137.9 kPa (about 20 psi) for 15 seconds, and 3) dispense 50 cc/min at 34.5 (about 5 psi) for 2 seconds. Without the aid of method 70 described below, the transient conditions of system 10 are counteracted by performing repeated calibration procedures and/or by discharging mixed material 12 between operating points until steady state conditions are present within system 10. Both methods result in additional manufacturing costs and/or wasted mixed material 12. However, method 70 as described below regulates system pressure Ps to the target pressure while system 10 is closed while actively compensating for hysteresis within system 10 and pressure regulator 40. Additionally, method 70 can optionally regulate system pressure Ps to a target pressure that is offset to counteract the initial pressure drop within system 10 when spray gun 14 is opened.

Figure 2:
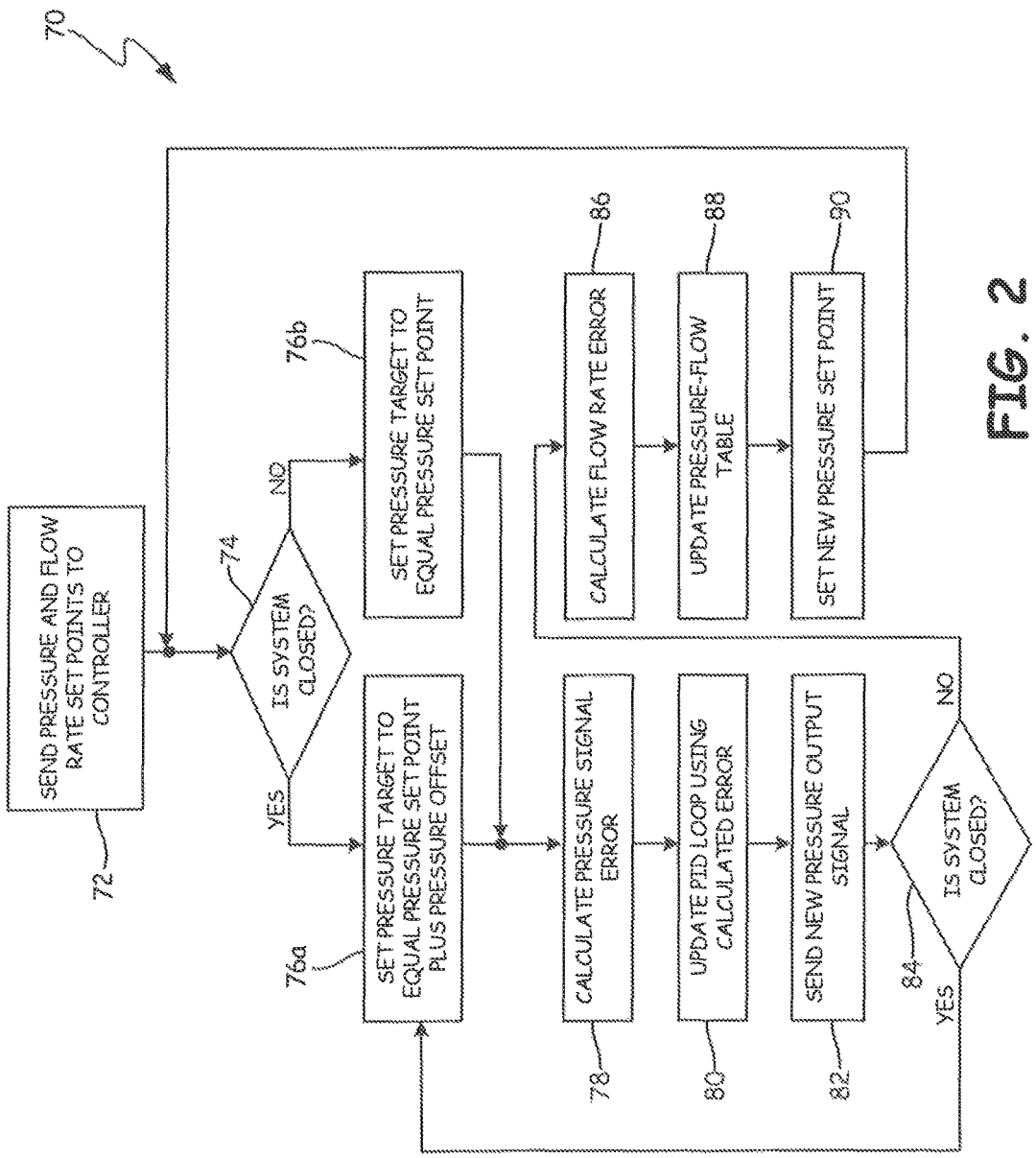
FIG. 2 is a flow chart showing a method for controlling a pressure of the industrial sprayer system in FIG. 1.

FIG. 2 is a flow chart showing method 70 of controlling system pressure Ps within a closed system (i.e., system 10 between operating conditions). Method 70 includes step 72 and the subsequent steps as described below.

Step 72 includes selecting and sending a pressure set point and a flow rate set point to controller 50. The specific pressure and flow rate set points are determined based on the requirements of mixed material 12, for instance, as explained in the previously described example.

In step 74, controller 50 determines the state (e.g., closed or open) of system 10. The controller can make this determination by receiving signals that communicate the position of the trigger or solenoid valve of spray gun 14. If system 10 is closed, step 76a is performed. Step 76a establishes a target pressure at spray gun 14 that is equal to the pressure set point plus a pressure offset. The pressure offset is selected to offset the effects of increasing or decreasing the pressure set point relative to the previously selected set point, as previously described above. Optionally, the pressure offset can also counteract the initial pressure drop within system 10 when spray gun 14 is opened. If system 10 is open, step 76b is performed. Because spray gun 14 dispenses mixed material 12 when system 10 is open, offsetting the target pressure is not necessary. Thus, step 76b establishes a target pressure equal to the pressure set point.

After establishing a target pressure, step 78 involves calculating the pressure signal error. The pressure signal error is determined by receiving signal S1 from pressure transducer 52 at controller 50 and comparing signal S1 to the target pressure. The difference between signal S1 and the target pressure is the pressure signal error, which is stored over time in controller 50.

In step 80, the pressure signal error is used to update the PID loop. Proportional-integral-derivative loops or PID loops are known in the art. Updating the PID loop involves adding the current signal error to a data set of prior collected pressure signal error values. Next, the accumulated pressure signal error values along with parameters inputted into the controller while tuning the controller initially are used to create a new pressure output signal C1. Output signal C1 is transmitted to control valve 42 in step 82.

In step 82, output signal C1 causes control valve 42 to increase or decrease pilot pressure Pp thereby changing system pressure Ps using pressure regulator 40. For example, if the pressure signal error indicates that the pressure target is less than current system pressure Ps, then controller 50 will transmit signal C1 commanding control valve 42 to increase pilot pressure Pp. Conversely, if the error indicates that the target pressure is greater than current system pressure Ps, then controller 50 will transmit signal C2 commanding control valve 42 to decrease pilot pressure Pp.

Following step 82 is step 84 in which controller 50 determines the state of system 10 for a second time. The manner in which controller 50 determines the state of system 10 is substantially similar to step 74. If system 10 is closed, steps 76a, 78, 80 and 82 are repeated. If system 10 is open, controller 50 performs steps 86, 88, and 90.

Step 86 involves calculating the flow rate error within system 10. Controller 50 receives signals S2 and S3 from sensors 60 and 62 located on meters 24 and 28, respectively. The current flow rate R within system 10 is equal to the flow rates R1 and R2 flowing through meters 24 and 28, respectively. In other embodiments of system 10, a single meter (e.g., meter 24) can be used or additional meters (not shown) can be used depending on the number of components used to form mixed material 12. In each case, flow rate R dispensed from spray gun 14 is equal to the summation of each component flowing through one or more meters included in system 10. To determine the flow rate signal error, controller 50 compares the flow rate set point to the total flow rate R of system 10. The flow rate signal error is the difference between the flow rate set point and flow rate R. Using the flow rate signal error, controller 50 updates a pressure-flow table in step 88 and determines a new pressure set point in step 90. The pressure-flow table is stored within controller 50 and relates system pressure Ps to flow rate R for a specific mixed material 12. Following step 90, steps 74, 76a or 76b, 78, 80 and 82 are repeated until the state of system 10 is open in step 84.

Although the present invention has been described with reference to preferred embodiments, workers skilled in the art will recognize that changes may be made in form and detail without departing from the spirit and scope of the invention.

The invention claimed is:

1. A method of varying a system pressure of a sprayer system includes:
    actuating a spray gun to a closed state, wherein the closed state stops to stop a fluid from flowing through and discharging from the sprayer system;
    using a controller to establish a pressure set point of the fluid corresponding to a desired fluid pressure at an outlet of the spray gun;
    detecting the closed state of the sprayer system; and
    after detecting the closed state:
        determining a pressure offset using the controller;
        determining a target pressure equal to the summation of the pressure set point and the pressure offset;
        sending a signal from the controller to a pressure control valve corresponding to the target pressure;
        actuating the pressure control valve to vary a pilot pressure of a control fluid within a control line that is fluidly connected to a pressure regulator, wherein a diaphragm of the pressure regulator fluidly separating the control fluid from the fluid contained within a system line acts on the fluid in response to the pilot pressure to vary the system pressure in response to the target pressure.

2. The method of claim 1, wherein the pressure regulator is air-operated and the control fluid is air.

3. The method of claim 1, wherein an increase of pilot pressure causes an increase of system pressure, and a decrease of pilot pressure causes a decrease of system pressure.

4. The method of claim 1 and further including:
    measuring the system pressure along a portion of the system line downstream of the pressure regulator; and
    sending a feedback signal to the controller based on the measured system pressure, wherein the controller modifies the pressure set point in response to the feedback signal.

5. The method of claim 1 and further including:
    supplying the control fluid to the pressure control valve through the control fluid supply line.

6. The method of claim 1, wherein the diaphragm is configured to vary the system pressure from a minimum system pressure to a maximum system pressure without adding or removing fluid from the system line.

7. The method of claim 1, wherein the pressure regulator is disposed downstream of a first meter and a second meter along the system line, and wherein the first meter supplies a first component and the second meter supplies a second component that are mixed within the system line to form the fluid.

8. The method of claim 1 and further including:
    actuating the trigger to open flow through the spray gun, wherein the pressure set point is greater than the desired fluid pressure at the outlet of the spray gun to counteract an expected system pressure loss caused by actuating the spray gun.

9. The method of claim 1, wherein using a controller to establish the pressure set point of the fluid comprises:
    selecting a tip pressure of the fluid at a spray nozzle;
    selecting a tip flow rate of the fluid at the spray nozzle;
    selecting the pressure set point to be greater than the tip pressure to account for the pressure loss between the pressure regulator and the spray nozzle at the tip flow rate.

10. The method of claim 1, wherein the pressure offset is selected to reduce the pressure set point.

* * * * *

UNITED STATES PATENT AND TRADEMARK OFFICE
CERTIFICATE OF CORRECTION

PATENT NO. : 10,550,552 B2
APPLICATION NO. : 15/306917
DATED : February 4, 2020
INVENTOR(S) : Peter N. Dufault and Todd A. Anderson Page 1 of 1

It is certified that error appears in the above-identified patent and that said Letters Patent is hereby corrected as shown below:

In the Specification

Column 3, Line 10:
Delete "51"
Insert --S1--

Column 3, Line 14:
Delete "51"
Insert --S1--

Signed and Sealed this
Seventh Day of April, 2020

Andrei Iancu
*Director of the United States Patent and Trademark Office*